United States Patent [19]
Holzmann et al.

[11] Patent Number: 5,190,358
[45] Date of Patent: Mar. 2, 1993

[54] ANTILOCK BRAKE SYSTEM FOR PROVIDING DIFFERENT BRAKE PRESSURES TO FRONT AND REAR WHEEL CIRCUITS

[75] Inventors: Roland Holzmann, Stuttgart; Karl-Heinz Willmann, Frieberg/Neckar; Michael Friedow, Tamm, all of Fed. Rep. of Germany

[73] Assignee: Robert Bosch GmbH, Stuttgart, Fed. Rep. of Germany

[21] Appl. No.: 606,264

[22] Filed: Oct. 31, 1990

[30] Foreign Application Priority Data

Feb. 13, 1990 [DE] Fed. Rep. of Germany ....... 4004270

[51] Int. Cl.[5] .................. B60T 8/26; B60T 13/16; B60T 13/66
[52] U.S. Cl. .................... 303/9.71; 303/DIG. 2; 303/DIG. 4; 303/9.62; 303/116.2; 303/116.1; 303/113.5
[58] Field of Search ............. 303/DIG. 1, DIG. 2, 303/116, 119, 113, 84.1, 113 TR, 116 SP, 116 R, 84.1, 113 AP, 9.71, 9.62, 9.73, DIG. 4

[56] References Cited

U.S. PATENT DOCUMENTS

| 4,462,642 | 7/1984 | Leiber | 303/119 |
| 4,750,788 | 6/1988 | Seibert et al. | 303/116 X |
| 4,807,944 | 2/1989 | Weise | 303/93 X |
| 4,818,038 | 4/1989 | Ocvirk et al. | 303/119 |
| 5,002,345 | 3/1991 | Becker | 303/115 X |

FOREIGN PATENT DOCUMENTS

| 3716514 | 11/1988 | Fed. Rep. of Germany ... 303/DIG. 2 |
| 3842699 | 6/1990 | Fed. Rep. of Germany ...... 303/116 |

Primary Examiner—Matthew C. Graham
Assistant Examiner—Josie A. Ballato
Attorney, Agent, or Firm—Edwin E. Greigg; Ronald E. Greigg

[57] ABSTRACT

A brake system having a master brake cylinder for producing a brake pressure controllable by a brake pedal and transmitting it to at least one brake circuit, which connects the master brake cylinder with corresponding wheel brake cylinders of the front and rear wheels. At least one shutoff valve for anti-skid control is incorporated into each main line of the brake circuits. A first and second brake circuit communicate downstream of the shutoff valves with a feed system, which has devices for feeding brake fluid at different pressures to the first and second brake circuit.

25 Claims, 6 Drawing Sheets

ANTILOCK BRAKE SYSTEM FOR PROVIDING DIFFERENT BRAKE PRESSURES TO FRONT AND REAR WHEEL CIRCUITS

BACKGROUND OF THE INVENTION

The invention relates to a brake system as defined hereinafter.

Such brake systems, having a master brake cylinder via which brake circuits are supplied with brake fluid, in particular one brake circuit for the front wheels and one brake circuit for the rear wheels, are quite well known, as is a corresponding shutoff valve assembly for anti-skid control as shown in U.S. Pat. Nos. 5,013,097 and 5,039,176.

The brake design for vehicle axles must take into account the dynamic axle loads and their variations, in particular. In the ideal case, the brake force is always proportional to the deceleration by braking and the dynamic axle load. However, this "ideal" brake force distribution varies very markedly with the deceleration by braking.

According to the guidelines of the European Community and the European Common Market, the wheels of the rear axle must not lock before those of the front axle in deceleration by braking of the vehicle up to 0.8 G, because if the rear axle wheels lock first the vehicle will skid, while if the front axle wheels lock first, although the ability to steer the vehicle is lost, the vehicle remains relatively stable.

Ideal brake force distribution would mean that both axles contribute equally to the braking regardless of the load status, which is virtually unattainable. Typically, in order to meet the prescribed guidelines, the brake pressure for the rear axle is reduced or limited, or else a fixed vehicle design, with very small wheel brake cylinders on the rear axle, is selected. However, this results in overbraking of the front axle (not to be mistaken for locking, that is, skidding) compared with the rear axle. This is achieved at least up to deceleration by braking of 0.8 G. With more forceful deceleration by braking, however, a reversal of the order of locking may occur, because then the rear axle is overbraked. In their case, whichever axle is overbraked contributes disproportionately to the deceleration by braking.

Most deceleration by braking occurs in a range of under 0.3 G. Because of the constantly heavier load, the brake system wears faster on the front axle than on the rear axle. Furthermore, optimal decelerations by braking are not achieved; this is a problem particularly for heavy, high-powered vehicles, in which the load limit on the front axle limits the possible vehicle performance. When there is a functional anti-skid system that assures the stability of a vehicle, increasing underbraking of the rear axle compared with the front axle is not only unnecessary but in fact prevents optimal decelerations by braking, because the brake pressures remain markedly below the skid limit.

OBJECT AND SUMMARY OF THE INVENTION

An object of the present invention is to achieve major pressure modulation in all the wheel brake cylinders when the anti-skid system is intact, and in the event of failure of the anti-skid system to keep the motor vehicle controllable and stable nevertheless.

In the present invention, first and second brake circuits communicate downstream of the shutoff valves with a feed system that has devices for feeding brake fluid at different pressures into the first and second brake circuit. As a result, an increase in brake pressure in individual circuits or wheels becomes possible in the normal braking situation, that is, when anti-skid control is not being performed. Feeding of the different pressures into the first and second brake circuit is done under control of the driver, so that only a relatively disproportionate increase in pressure between the rear axle circuit and the front axle circuit takes place. As a result, the previously severely underbraked brake devices of the rear axle are for instance increasingly included in a braking event.

To control the feed, feed valves are provided between the first and second brake circuit, respectively, and the feed system; the actuation of the feed system is regulated via these valves. Check valves downstream of the feed valves for the first brake circuit prevent consumption of fluid of the first brake circuit through additional volumes and leakage in the feed system. They contribute considerably to safety as a result. Instead of these check valves, corresponding magnet valves with a check position may be provided. As equipment for pumping the additional brake fluid from the feed system into the first or second brake circuit, a self-aspirating pump is provided, and a reservoir is additionally associated with it if the volumetric flow is inadequate. According to the invention, the pump may be either a single-circuit or a dual-circuit pump. As a rule, it is driven by a separate electric motor. It may also be embodied as a tandem pump or flange pump.

In one exemplary embodiment of the invention, the pump communicates via a line directly with the feed valve of the second brake circuit, while the feed pressure for the feed valve of the first brake circuit is adaptable via pressure limiting valves. In the present case, the terms "first and second brake circuit" refer as a rule to a black-and-white type of brake circuit distribution, in which the second brake circuit supplies brake fluid to the wheel brake systems of the rear axle, and the first brake circuit supplies brake fluid to the wheel brake systems of the front axle. If desired, however, the supply can also be done conversely.

One essential feature in the present case is the pressure limiting valves. Via these pressure limiting valves, the feed to the first brake circuit is intended to be controlled such that it takes place as a function of a brake pressure in the second brake circuit. For this reason, one pressure limiting valve is provided with two equal-sized hydraulically acted-upon faces on its valve body, one of the faces communicating with the second brake circuit, preferably near the master brake cylinder. In the other pressure limiting valve, the faces of the valve body that are acted upon are of different sizes, and the smaller face communicates with the supply pressure of the pump. As counteracting forces to these pressures, the front axle feed pressure that prevails between the pressure limiting valves is used, for both the first and second valves. For instance, if the pressure in the feed line downstream of the first pressure limiting valve rises above the pressure that prevails in the second brake circuit, then the pressure limiting valve switches open and opens the route for the brake fluid back to a return line or to the appropriate storage container. Contrarily, the feed line from the pump to the first brake circuit is opened by the first pressure limiting valve whenever a relatively higher pressure is built up upstream of the smaller face of the valve body. If the disproportionately increased pressure on the smaller face predominates over the holding pressure on the larger face, the valve opens and limits the feed pressure for the second brake circuit. However, since the contrary holding pressure depends on the brake pressure in the second brake circuit, only a relatively disproportionate increase in the pressure in one brake circuit ever occurs, compared with the pressure in the other brake circuit. The feed system can never initiate braking against the intentions of the driver, as is possible in many systems that are independent of the brake pressure.

It is intentionally of secondary importance how the various pressure limiting valves are embodied. An essential factor is that in at least one pressure limiting valve, two hydraulically acted-upon faces of different sizes are formed, with the one, larger face being subjected to the pressure of the other brake circuit.

It is also within the scope of the invention that optional traction control (ASR) is likewise effected via the feed system. Separate control of each wheel is provided for the second brake circuit, in which the applicable control valves for each wheel are disposed only downstream of the corresponding feed valve. The brake fluid for traction control is naturally furnished by the aforementioned pump; in traction control, the feed valves are open.

If a dual-circuit pump is used, it is an attractive option to decouple the pressure limiting valves as well. Once again, however, the ratio between the hydraulically acted-upon faces within the pressure limiting valve is important. In one exemplary embodiment, the pressure limiting valve having two equal-sized hydraulically acted-upon faces is associated with the first brake circuit. This pressure limiting valve communicates with the first brake circuit downstream of the master brake cylinder. If the pressure in this first brake circuit increases, then the pressure limiting valve does not switch over until there is an increased feed pressure.

Similarly, the second pressure limiting valve is coupled on the one hand to the second brake circuit near the brake booster and on the other to the feed line. The pressure in the feed line acts upon the smaller face, however, so that here the feed pressure can be increased substantially before the pressure limiting valve switches over.

In another exemplary embodiment of the invention, the actual feed valve between the pump and the second brake circuit is absent. Instead, a feed and shutoff valve is provided, which makes the control or adaptation between the feed system and the second brake circuit easier. A throttle provided upstream of this feed and shutoff valve limits the pressure buildup gradient in the downstream wheel brake cylinders, upon a switchover to an electrical or electronic brake force distribution It is self-evident that the present brake system can operate with a three-channel or a four-channel anti-skid system. This four-channel anti-skid system is also intended to be within the scope of the present invention.

Another option for brake force distribution is for pressure pickup and control not to be left to the corresponding pressure limiting valves but rather for a control unit to be provided for this purpose. A pressure pickup is effected in both the first and second brake circuit and in the feed system. The pedal travel is also monitored. The control unit then takes on the task of controlling all the valves and also the motor of the feed system. In the control unit, the pressure in both brake circuits are compared with one another and regulated in terms of ideal distribution. The control is then effected by feeding additional brake fluid through the feed system into the corresponding brake circuit. For this reason, both brake circuits communicate with the feed system via a corresponding feed valve. Naturally, other valves are also provided for regulating the fluid feed.

The control unit also takes over control in an anti-skid situation, shutting the applicable valves and opening others, for releasing pressure, With the aid of the pedal travel transducer it is assured that if there is an increase in the coefficient of friction during an anti-skid situation the shift in characteristic curve becomes so great that when the brake is released the central valve in the master brake cylinder will not be damaged. This is attained by making additional pedal travel available as needed, which is done either by a buildup of pressure in the first brake circuit or by a shift in volume from the master brake cylinder into the supply container. Once again, the comparison of a given pedal travel with the pressure ascertained in the first brake circuit is important.

One substantial advantage of the arrangement having the control unit is that the zero position of the pressure sensors can be corrected whenever braking is not taking place. This is done automatically via the control unit by actuation of the various valves.

A cycle for testing the bleeding status of the rear axle while the vehicle is stopped is also provided. In this test cycle, the second brake circuit for the rear axle is put under pressure, and the time required to overcome a predetermined pressure buildup or to overcome the difference between two pressure values is ascertained. A time can be calculated from this that must not be exceeded for a pressure buildup if the bleeding status is in order.

The traction control is also effected via the feed system, in accordance with the known hydraulic multiplexing process.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
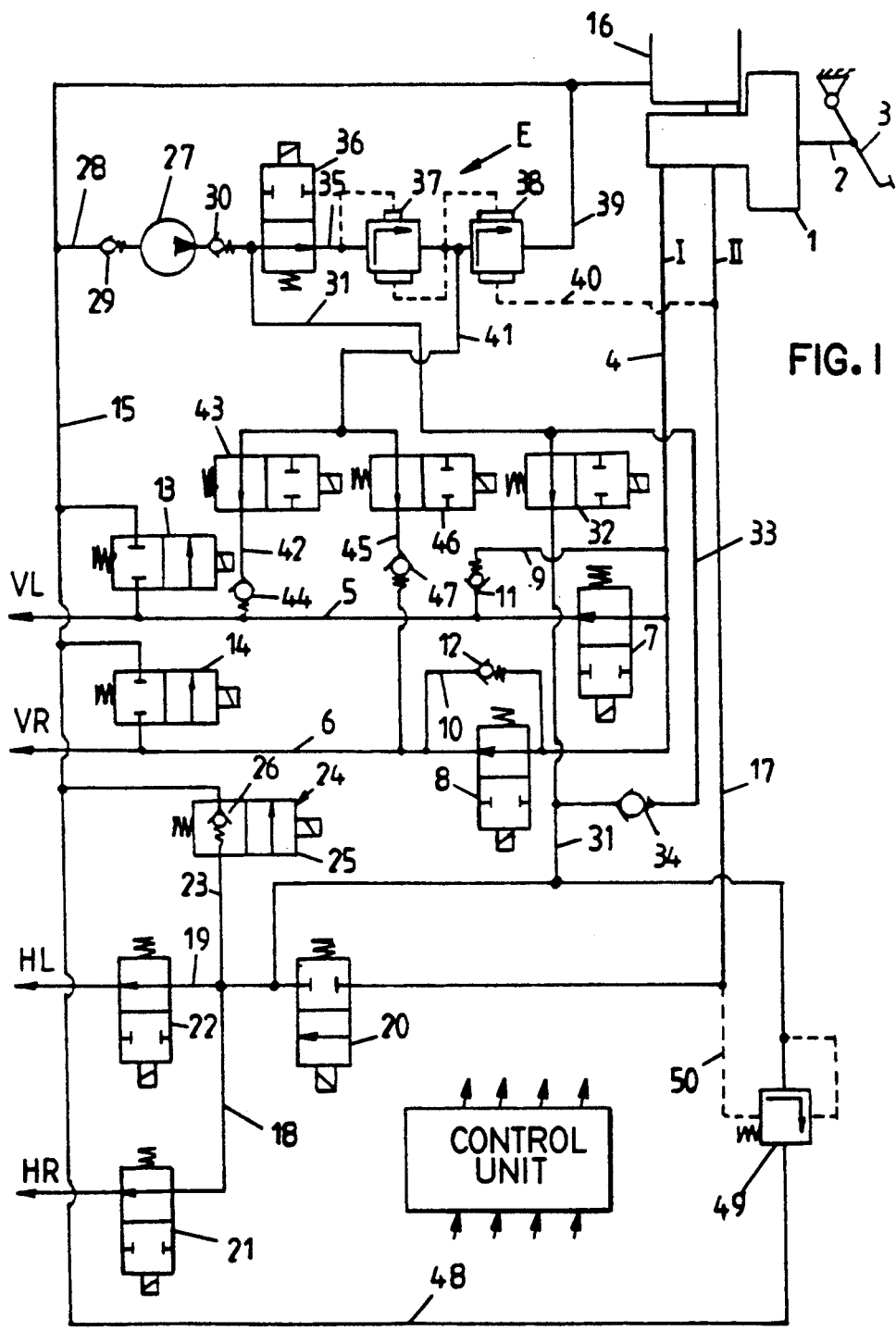
FIG. 1 is a block circuit diagram of a brake system according to the invention having electrical or electronic brake force distribution.
Figure 3:
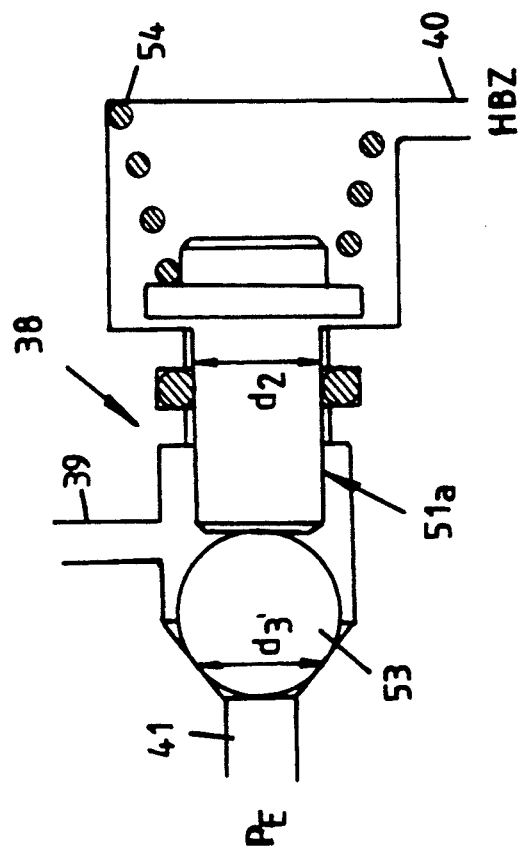
FIG. 3 is a schematic longitudinal section through a modified pressure limiting valve.

In FIG. 1, a brake system has a first and second brake circuit I and II, respectively. Both brake circuits discharge from a corresponding master brake cylinder 1, the detailed embodiment of which for two brake circuits is well known. Via a piston rod 2, the master brake cylinder 1 is acted upon by brake pressure transmitted from the driver's foot by a brake pedal 3.

Via the first brake circuit, the left and right front wheel, or their wheel brake cylinders (not shown in detail), are supplied with brake fluid. This takes place via a common main line 4, which divides into two branch lines 5 and 6. By means of a respective shutoff valve 7 and 8 incorporated into each branch line 5 and 6, the applicable branch line 5 and 6 can be disconnected from the main line 4. Both shutoff valves 7 and 8 can be respectively, circumvented by a bypass line 9 and 10, each of them including a one-way check valve 11 and 12 which returns brake fluid back to the brake circuit I.

To decrease brake pressure, for example at the onset of anti-skid control, each brake line 5 and 6 communicates via a further discharge valve 13 or 14 with a return line 15 leading to a supply container 16.

The second brake circuit likewise has a main line 17 that divides into two branch lines 18 and 19. Also incorporated into each branch line 18 and 19 is a respective shutoff and selection valve 21 and 22, which as described hereinafter serves the purpose of traction control. To this end, both branch lines 18 and 19 are connected to the return line 15 via a connection line 23 and a check-discharge valve 24. This valve 24 has, first, a return position 25 for the reduction of brake pressure and second, a check position 26.

One feed system E is associated with both brake circuits I and II. In the present exemplary embodiment, this feed system E has a single-circuit pump, which is preferably self-aspirating. However, if the volumetric flow is inadequate, an additional reservoir feed line should also be provided. Moreover, the pump is a separate pump operated by an electric motor; it may also be a tandem or flange pump. This pump 27 pumps brake fluid into the feed system E. It draws this brake fluid from the supply container 16, and a pump check valve 29 is incorporated in the corresponding connection line 28.

Pumping of the brake fluid is effected through a further pump one-way check valve 30, downstream of which a line 31 branches off that communicates with the main line 17 of the second brake circuit downstream of the shutoff valve 20. Both pump check valves 29, 30 are integrated elements of the pump 27. A feed valve 32, via which the line 31 can be closed, is also incorporated into the line 31. For this feed valve 32, a bypass 33 having a corresponding check valve 34 which permits fluid flow back to the feed system E.

A further line 35 leads downstream of the one-way check valve 30 through a shutoff valve 36 to a pressure limiting valve 37. This pressure limiting valve 37 is followed by a second pressure limiting valve 38, which leads via a connecting line 39 to the return line 15. This valve is a pressure-controlled valve.

A feed line 41 branches off between the pressure limiting valve 37 and the pressure limiting valve 38 and itself branches off, communicating by a branch line 42, via a feed valve 43 and a following check valve 44, with the branch line 5 to the left front wheel. A second branch line 45 with an incorporated feed valve 46 and a following check valve 47, leads to the branch line 6 for the right front wheel.

The return line 15 also has a connection line 48 includes therein a pressure limiting valve 49 through which return fluid is connected to the line 31, specifically downstream of the feed valve 32. The differential pressure limiting valve 49 is inserted into this connection as a valve acted upon by pressure; it has a communication 50, shown only in dashed lines with the main line 17 of brake circuit II.

The mode of operation of the brake system according to the invention is as follows:

1. Normal braking is possible in the conventional way in brake circuit I; brake circuit I is supplied with brake pressure by the buildup of pressure in the master brake cylinder 1, and this brake pressure then acts upon the applicable wheel brake cylinder in the left and right front wheels. For the rear axle, fluid is fed at increased pressure, compared with brake circuit I, via the feed valve 32 and connected to the line 19 downstream of the shutoff valve 20, so that the wheel brake cylinders of the rear wheel brakes are supplied.

2. At the onset of anti-skid control, the shutoff valves 7 and 8 close, and the shutoff valve 20 stays closed. This uncouples the applicable main lines 4 and 17 of the two brake circuits I and II. The buildup of brake pressure for the wheel brake cylinders is modulated via the feed valves 32, 43 and 46, and the corresponding discharge valves 13, 14 and 24 which returns brake fluid from the brake cylinders to the return line 15 to the pump 27. The pump 27 either runs continuously or pumps brake fluid from the onset of braking.

3. Anti-skid control is effected via the shutoff and selection valves 21, 22 and shutoff valve 36; feeding, with rear-wheel drive, is effected via the feed valve 32. The pressure limitation for traction control, or ASR, is performed by the differential-pressure-controlled pressure limiting valve 49 (system protection function) with the shutoff valve 36 in a closed position.

Otherwise, the shutoff valve 20 is normally switched to the closed position, both during normal braking and during anti-skid control or traction control. It assumes its open position only in the event of a failure of servopressure, which can for instance happen if the pump 27 fails. Braking of the wheels of the rear axle via the master brake cylinder is always possible; that is, in emergencies a full brake fluid reserve is maintained for brake circuit II. The check position of the discharge valve 24 assures that reaspiration of brake fluid will be possible for the wheel brake cylinders of the left and right rear wheels.

In the event of failure of brake circuit I or II, the other brake circuit remains intact, while the feed system is shut off.

Figure 2:
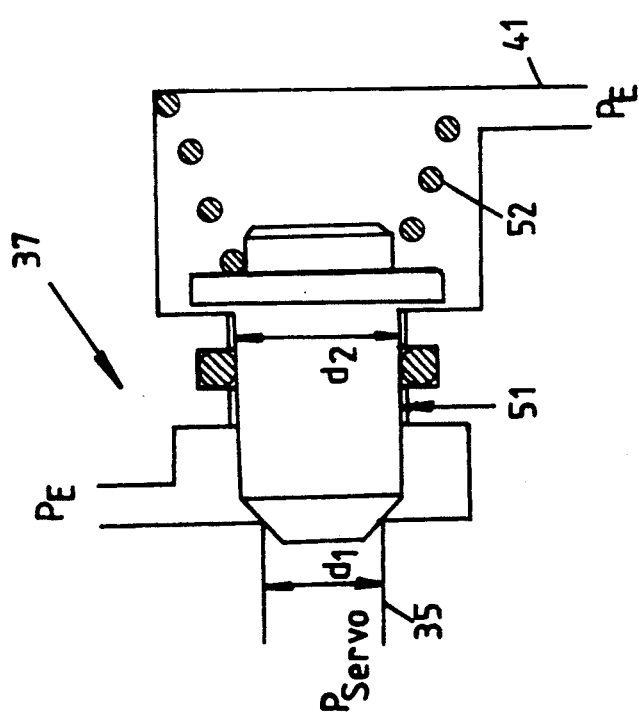
FIG. 2 is a schematic longitudinal section through a pressure limiting valve.

The brake force distribution is substantially controlled via the respective pressure limiting valves 37 and 38. To this end, the pressure limiting valve 37 is provided with two hydraulically acted-upon faces of different sizes, as shown in FIG. 2. There, a corresponding valve body 51 is kept in the position shown under the pressure of a helical spring 52. The pressure of the helical spring is reinforced by a feed pressure $P_E$, which prevails in the feed line 41.

The valve body 51 has a diameter $d_2$, which is larger than the diameter $d_1$ of the line 35. The servopressure $P_{Servo}$ is present in this line. However, the line 35 is closed by the valve body 51 and thus disconnected from the feed line. For opening this pressure limiting valve, the pressure $P_{Servo}$ must be higher than the holding pressure $P_E$.

The pressure limiting valve 38 that follows the pressure limiting valve 37 has, first, the connection to the feed line 41 in which the feed pressure $P_E$ is operative. Via a further valve body 51a having the diameter $d_2$, a valve ball 53 is pressed against the opening of the feed line 41, so that the corresponding effective valve seat has a diameter of $d_3$. In this case, $d_3$ is equal to $d_2$. As long as the ball 53 keeps the line 41 closed, communication between the feed line 41 and the connecting line 39 to the return or supply container 16 is interrupted. The closing force of the valve body 51a is maintained, first by means of a helical spring 54 and second by the pressure via the connection 40 with the brake circuit II of the master brake cylinder 1.

With this kind of brake force distribution according to the invention, there is no pedal feedback. Nor does a brief, sudden increase of pressure take place in the wheel brake cylinders. Only a relatively disproportionate increase of pressure in the wheel brake cylinders of the wheels of the rear axle relative to that in the wheel brake cylinders of the wheels of the front axle takes place; an absolute disproportionate increase in pressure does not occur. This important safety function assures that the feed system can never initiate braking against the wishes of the driver, as is for instance possible in those systems that are completely separated from any action by the driver.

In the present brake system sensing of the following functions takes place:
wheel behavior, by suitable wheel sensors
circuit failure in the master brake cylinder, recognized by a pressure difference sensor, and
function of the servopump.

If the sensors report failure in one of these respects, then the desired switching actions in the feed system and in the remainder of the brake system must be performed via a control unit, not shown in detail.

The brake system of FIG. 1 also relates to a three-channel anti-skid system with black-and-white brake circuit distribution. For a four-channel anti-skid system, the same configuration may be used and can be achieved without fundamental differences or major alterations.

If for particular reasons the shutoff valve 20 is a 2/2-way electromagnetic valve that is open when no current is provided 20, then the feed valve 32 is closed in the outset position (when it is without current). The shutoff valve 20 must now be switched before the feed valve 22 upon each braking event; otherwise there would be pronounced pedal feedback, and the master brake cylinder piston would be pushed back. This could damage the central valve of the master brake cylinder. The pressure in the wheel brake cylinders would also increase abruptly, which would impair the smoothness of the rise and also provoke frequent anti-skid control. The shutoff valve 20 must switch rapidly upon brake actuation, in order to keep an adequate quantity of fluid available in the master brake cylinder.

Figure 4:
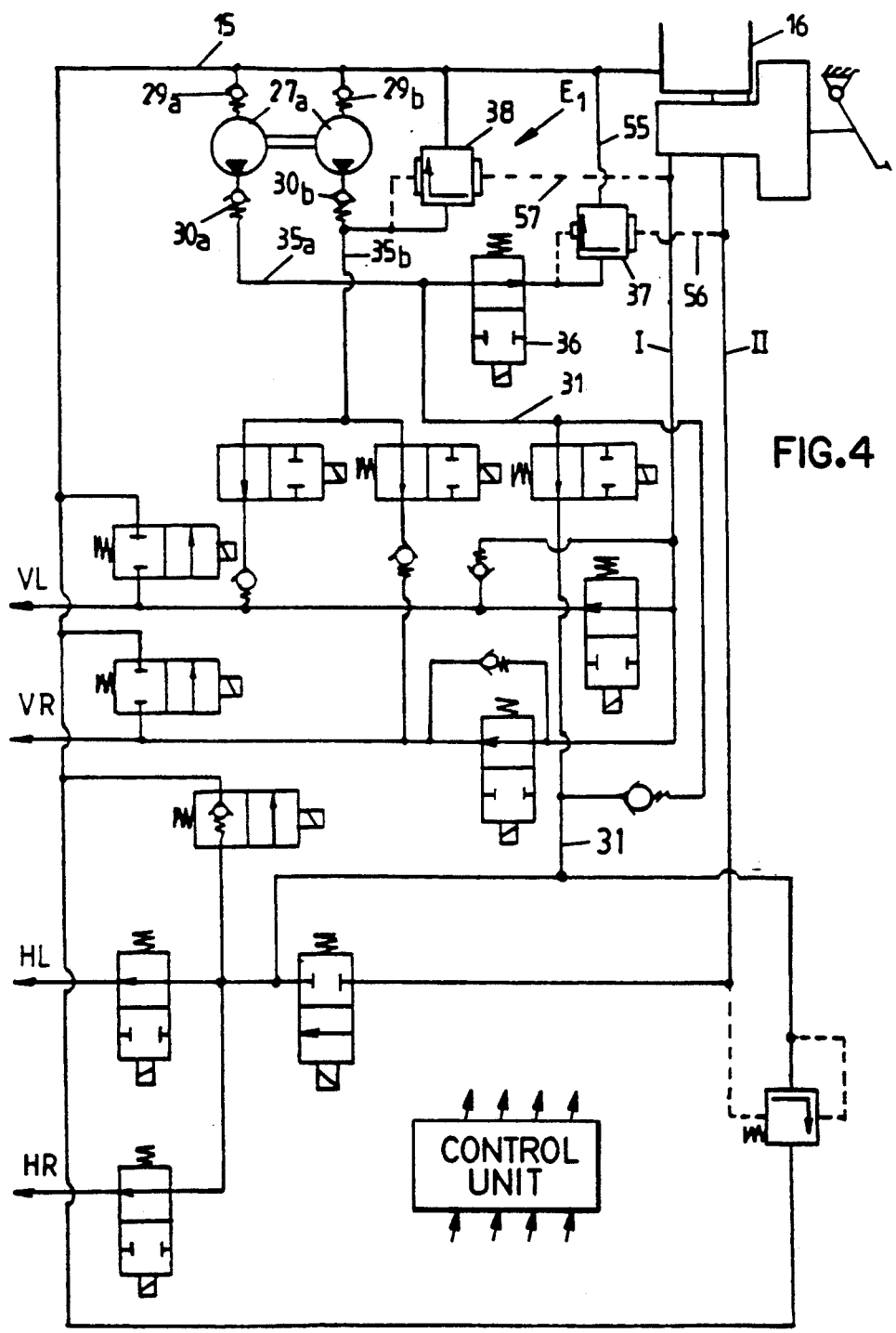
FIG. 4 is a block circuit diagram of a second embodiment of the brake system with a feed system which includes a dual circuit pump.

The second exemplary embodiment of the brake system of FIG. 4 differs from that of FIG. 1 in particular in the embodiment of the feed system $E_1$. For this feed system $E_1$, a dual-circuit pump 27a is provided. Corresponding one-way pump check valves 29a and 29b connect the pump 27a to the return line 15 for a supply of fluid. The pump 27a is also followed on its outlet side by the one-way pump check valves 30a and 30b. All the pump check valves 29a, 29b and 30a, 30b are integral components of the applicable pump.

The line 35a, via the shutoff valve 36, connects the one pump circuit to the pressure limiting valve 37. In the present exemplary embodiment, this pressure limiting valve, as a pressure-controlled valve, communicates with the return 15 via the line 55.

Feeding of fluid for the front axle brake circuit is contrarily controlled through the second circuit of the pump 27a via the line 35b. This line communicates with the return line 15 by means of the pressure limiting valve 38. This pressure limiting valve 38 likewise has a connection 57 to the first brake circuit. A desired pressure difference between brake circuits I and II is assured in turn by means of the pressure limiting valve 37, which as shown in FIG. 2 has two faces of different effective diameters that can be acted upon differently with pressure. The first and second pressure limit value of the first and second pressure limiting valves 37 and 38 is determined by the pressure in the brake lines II and I, respectively, since the pressure limiting valve 37 is connected to the brake circuit line II and the pressure limiting valve 38 is connected to the brake circuit line I. The greater or less the pressure is in the brake circuits I and II will determine the pressure value at which the pressure limiting valves will open.

Figure 5:
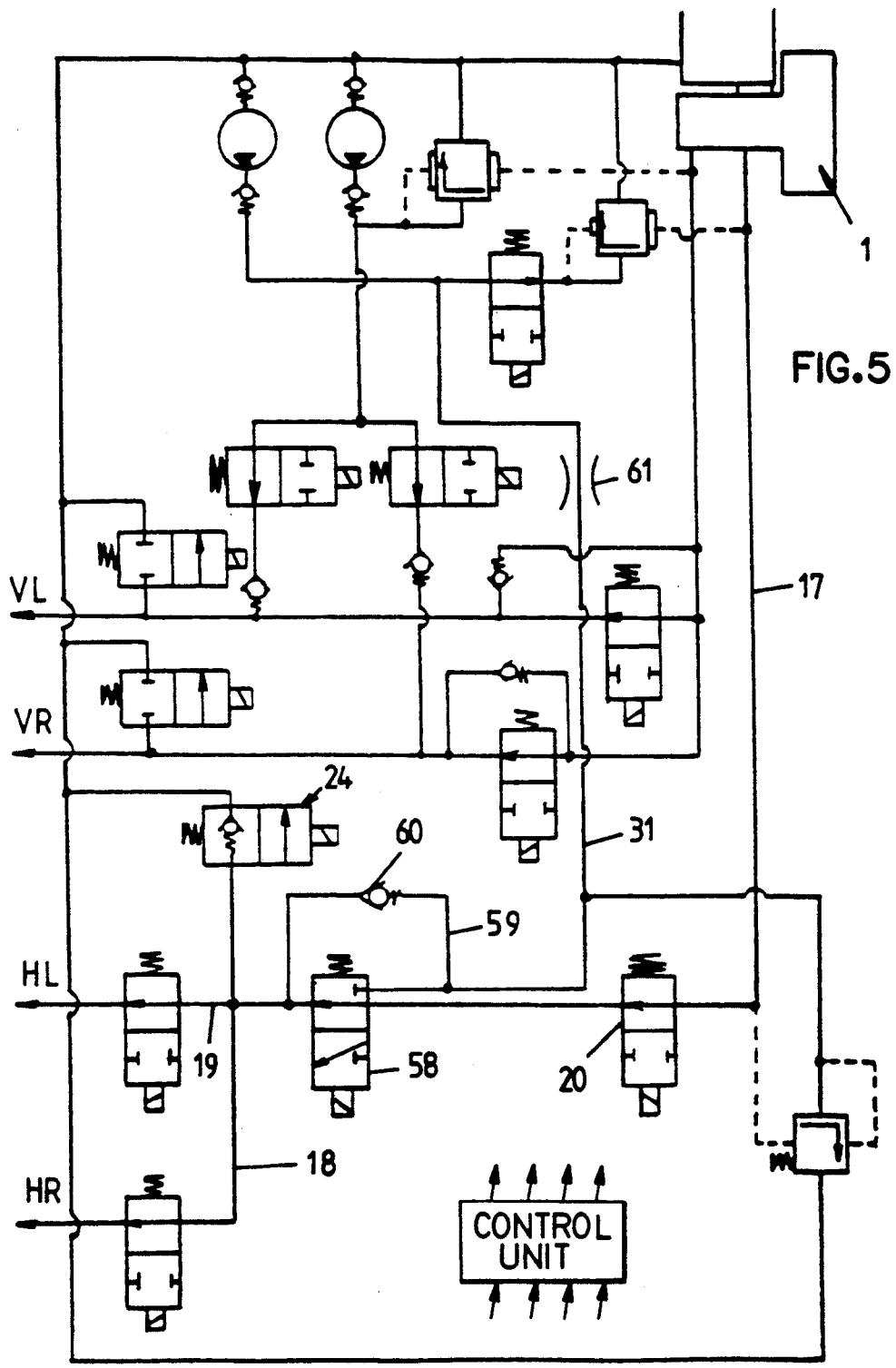
FIG. 5 is a block circuit diagram of a third exemplary embodiment of the brake system which includes a feed and shutoff valve.

In FIG. 5, a third exemplary embodiment of a brake system according to the invention is shown, in which the feed valve 32 is replaced by a feed and shutoff valve 58. Because of this combined valve 58, the successive valve functions, which otherwise would have to take place one after another as described in FIG. 1, are assured. In the position shown, the valve 58 blocks the line 31, while it allows the flow of brake fluid out of the master brake cylinder 1 to the left and right rear wheels.

Switching over the valve 58 blocks the main line 17, but makes the feed line 31 communicate with the corresponding branch lines 18 and 19. Between the line 31 and the main line 17, the valve 58 is circumvented by a further bypass 59, which is equipped with a check valve 60 through which brake fluid is fed from downstream of valve 58 to upstream of valve 58. It should be assured as needed that the discharge valve 24 cannot be actuated until the combination valve 58 has switched over. This may be done for instance by means of a suitable switch or relay, or the like.

A throttle 61 is also provided in the line 31. By means of this throttle, a limitation of the pressure buildup gradient in the wheel brake cylinders of the left and right rear wheels takes place upon a switchover from feed operation to a cancellation of the rear axle brake pressure.

Figure 6:
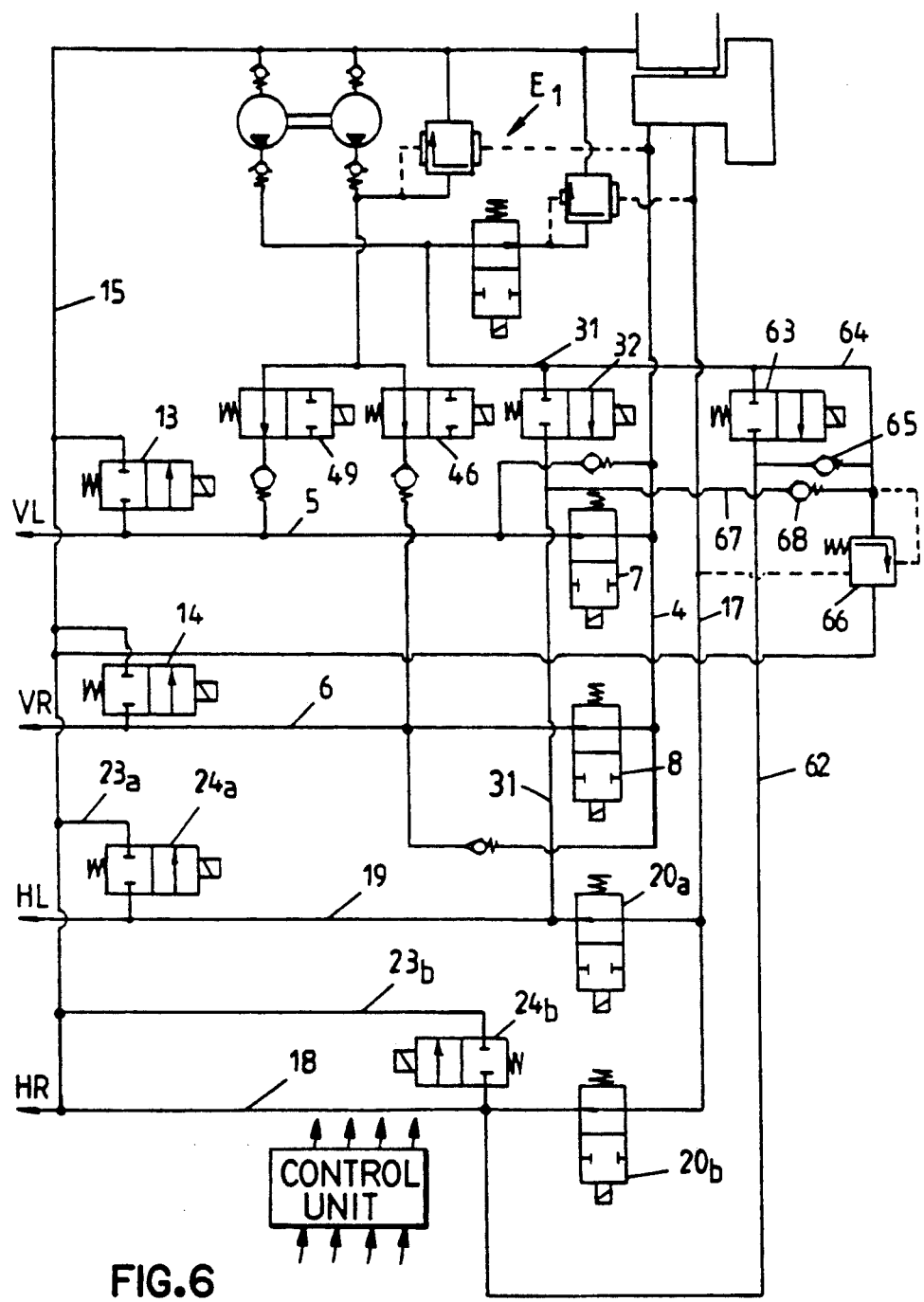
FIG. 6 is a block circuit diagram of a fourth exemplary embodiment of the brake system includes a four channel anti-skid system.

FIG. 6 shows a fourth exemplary embodiment of an electric or electronic brake force distribution according to the invention, specifically in a four-channel anti-skid system. Once again the brake force distribution is black-and-white. For both the left and right rear wheel, a separate shutoff valve 20a and 20b is provided. Likewise, each branch line 18 and 19 has a connection line 23a and 23b, respectively, to the return line 15 located between the respective wheel brake cylinder and the shutoff valve 20a or 20b; the discharge valves 24a and 24b incorporated in the return line are standard, typical shutoff valves.

The feed system $E_1$ is equivalent to that of FIG. 4. However, an additional line 62 is connected from the feed system $E_1$ to downstream of the shutoff valve 20b for separate feeding to the left and right rear wheels; this line joins the line 31 with the branch line 18. Incorporated into this line 62 is a further shutoff valve 63, which is circumvented by a bypass 64 having a one-way check valve 65. Pressure adjustment for traction control in this system is provided by a pressure limiting valve 66, which is connected to both the bypass 64 and the return line 15. By means of the pressure limiting valve 66, a pressure comparison with the pressure in the main line 17 of the second brake circuit and with the pressure in the bypass line 64 takes place; at the same time, there is communication via a line 67 with the feed line 31 via a one-way check valve 68 in the line 67.

Figure 7:
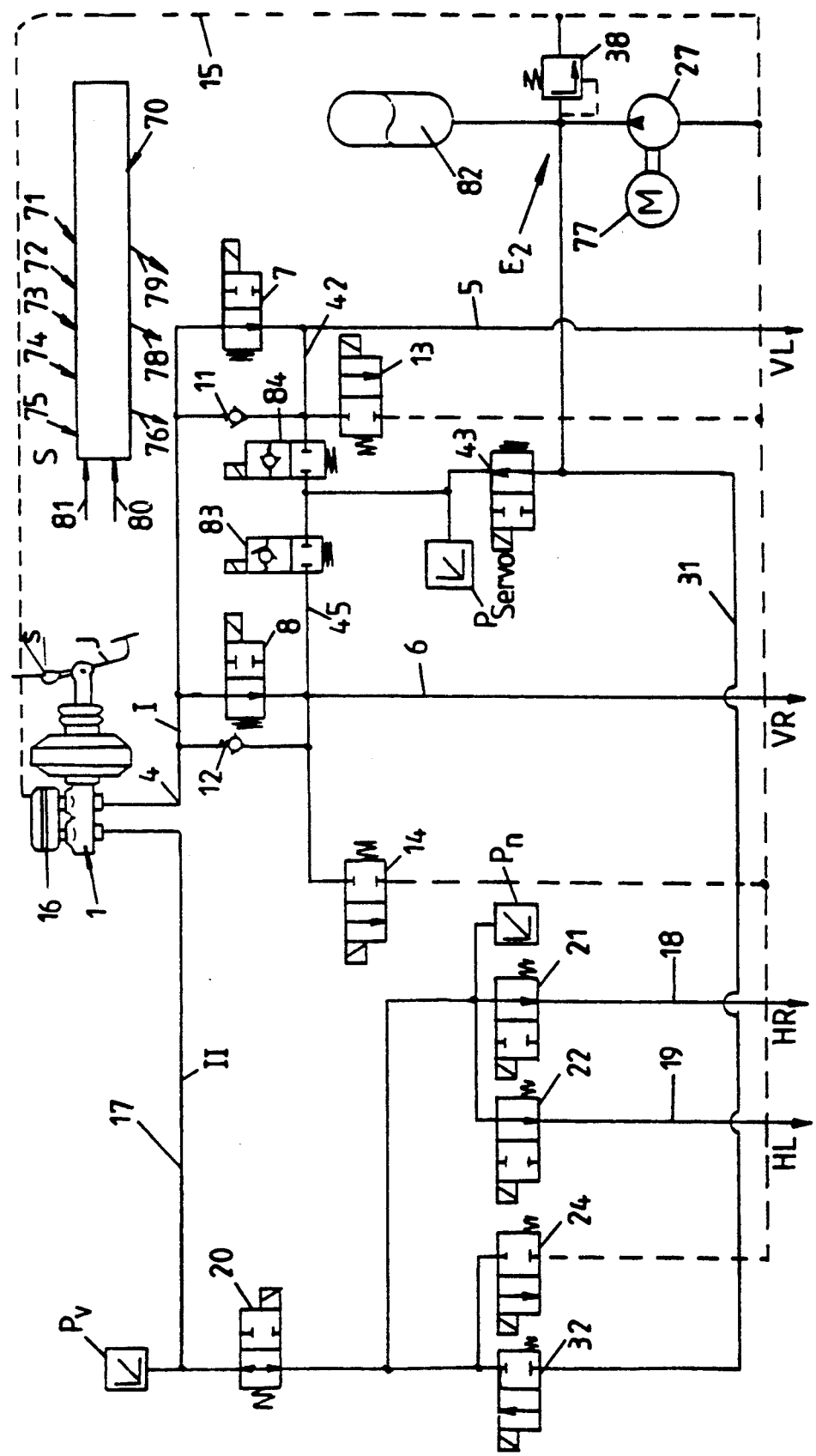
FIG. 7 is a block circuit diagram of a fifth exemplary embodiment of the brake system includes differently arranged elements and a control unit.

In the fifth exemplary embodiment of a brake system according to the invention shown in FIG. 7, a control unit 70 is provided, via which the entire brake system is controlled. This control unit includes a connection 71 to the wheel sensors (not shown in detail); a further connection 72 to a servopressure detector $P_{Servo}$; another connection 73 to a pressure detector pickup $P_n$ for detection of the rear axle pressure; a connection 74 for detection of the front axle pressure $P_v$; and a connection 75 for detection of the brake pedal travel S. The control unit also takes on the control of the valves, with respect to which only one output 76 is provided here, for the sake of simplicity. A motor 77 for the pump 27 is also triggered via the control unit 70; the output 78 is provided for this purpose. A warning light 79 indicates problems in the brake system. The complete control unit has additional connections 80 and 81 to the battery and ignition, respectively. A control unit such as set forth in FIG. 7 is provided for each of the brake systems shown in FIGS. 1, 4, 5 and 6.

The shutoff valves 7 and 8 for the wheels of the front axle are located in the first brake circuit I. The check valves 11 and 12 already described above are also assigned to these shutoff valves. However, in the present case, instead of the two feed valves 43 and 46 with the check valves 44 and 47, only the feed valve 43 is provided between the pump 27 and a corresponding reservoir 82, after which feed valve, however, the corresponding branch line 45 to the branch line 6 or the branch line 42 to the branch line 5 is equipped with additional electromagnetic valves 83 and 84, respectively, instead of the check valves 44 and 47. These electromagnetic valves have a blocking position and a checking position.

In partial braking, the shutoff valves 7 and 8 are switched open, while the discharge valves 13 and 14, the feed valve 43, and the electromagnetic valves 83 and 84 remain in the blocking position. As a result, a pressure modulation in the wheel brake cylinders of the right and left front wheels is directly possible by actuating the master brake cylinder.

Upon partial braking when the control unit 70 is intact, the shutoff valve 20 in the main line 17 of brake circuit II to the wheels of the rear axle will be closed. The same is true for the shutoff and selection valves 21 and 22. Here, a pressure modulation takes place via feeding brake fluid through the line 31 and the feed valve 32 via a feed system $E_2$. This feed system $E_2$ is distinguished from those described above in that only one pressure limiting valve 38 is present, because in this case no measurement of differential pressure is performed in the feed system itself. The applicable control is performed by the control unit 70.

Pressure modulation in brake circuit II is effected in accordance with the ideal brake force distribution and under the control of the control unit 70. This unit compares the picked-up pressure values $P_n$ and $P_v$ and modulates the brake pressure in the rear axle in accordance with a predetermined ideal curve.

If the situation of anti-skid control occurs at one wheel of the front axle, then the feed valve 43, the shutoff valves 7 and 8 and the magnet valves 83 and 84 are triggered by the control unit 70. This means that the shutoff valves 7 and 8 close, while the feed valve 43 opens. The two electromagnetic valves 83 and 84 assume the check position. Brake fluid can now be pumped by the pump 27, via the feed valve 43 and the electromagnetic valve 83 or 84, to the right or left front wheel brake cylinder as applicable. The pressure adjustment is effected via the feed valve 43.

A pressure reduction subsequently takes place via the discharge valves 13 and 14 back to the return line 15.

If only the right front wheel needs to be controlled in an anti-skid control situation, for example, the applicable wheel sensor determines this, so that the electromagnetic valve 84, for example, then remains closed while a pressure increase is effected via the trigger time of the feed valve 43. If the wheel sensor of the left front wheel then for instance additionally demands a pressure buildup in the wheel brake cylinder of the left front wheel, then the electromagnetic valve 84 is also opened. The volume of the line, which is limited by the electromagnetic valves 83 and 84 and by the feed valve 43, is virtually incompressible, so no impeding volume is stored.

If neither front wheel requires a pressure buildup, the electromagnetic valves 83 and 84 may nevertheless remain in the check position, because then the feed valve 43 is closed. In that case the pressure detector $P_{Servo}$ indicates only the pressure that is present in the line between the feed valve 43 and the electromagnetic valve 83 and 84. During the pressure buildup time or after the opening of the feed valve 43, the pressure detector $P_{Servo}$ indicates the particular actual wheel pressure (with the electromagnetic valves 83 and 84 opened). When the system is in functional condition, the control unit 70 does not allow any higher pressure at detector $P_{Servo}$ than that indicated by the pressure detector $P_v$, so that no higher pressure than that indicated by the driver is fed into the front wheel brakes.

With the aid of the pedal travel transducer S, care is taken that if there is an increase in the coefficient of friction during anti-skid control, the shift in the characteristic curve does not become so great that the central valve in the master brake cylinder would be damaged upon release of the brake. This is achieved by allowing additional pedal travel in case of need, whether from a pressure buildup in the master line 4 or branch lines 5 and 6 via the shutoff valves 7 and 8 to the left and right front wheels, or by shifting volume from the master brake cylinder into the supply container 16 via the shutoff valve 20 and the discharge valve 24. Such a need exists above all if the connection between the pedal travel and the front axle pressure $P_v$ that the control unit 70 requires does not exist. Moreover, the curve of the required minimum pedal travel may also be made dependent on the increase in the coefficient of friction during the anti-skid control.

Provision is made for correcting the zero position of the pressure detectors $P_n$ and $P_v$ whenever the pedal travel transducer S recognizes that braking is not occurring. The zero position of the pressure detector $P_{Servo}$ can contrarily be corrected by intermittently triggering the feed valve 43 and the electromagnetic valves 83 and 84, as long as braking is not being done. This zero setting is also effected automatically via the control unit.

The bleeding status of brake circuit II is also monitored for the right and left rear wheels. This is done with a test cycle while the vehicle is at a stop. The shutoff valve 20 is closed and the feed valve 32 opened, while the behavior of the pressure detector $P_n$ over time is monitored. In this process, the time needed to increase the pressure to 20 bar, for instance, is first ascertained; then the time t2 required to raise the pressure from 20 bar to 50 bar is determined. From the time t2, a conclusion as to the temperature of the fluid can be drawn, so that a time t1 that is not exceeded as long as the bleeding status of the rear axle brake circuit is in order can be calculated.

This test cycle is based on the concept that in the upper pressure range (above approximately 20 bar), the gradient is no longer dependent on the bleeding status.

A circuit failure, for instance of brake circuit I of the front axle, is recognized via the comparison between the brake pedal travel transducer and the pressure detector $P_v$. During anti-skid control, circuit failure is detected via the trigger time of the valves 7, 8, 43, 83 and 84.

If failure of circuit I is recognized, feeding of brake fluid into brake circuit I of the front axle is forbidden; the piston rod 2, with its rod piston, will strike the float piston (not shown in detail) in the master brake cylinder 1. Since the shutoff valve 20 is closed, however, no further pedal travel is possible; in any case the brake boosting factor (that is, the ratio of the pedal force to the pressure P) can be selected such that it results in an optimum for the present situation. In that case, nonlinearity in the ratio between the pressure at detector $P_v$ and the pressure at detector $P_n$ is then possible.

For traction control for the wheels of the rear axle, the shutoff valve 20 is closed, and by the feed system $E_2$ brake fluid is fed into brake circuit II via the line 31 and the feed valve 32.

The shutoff and selection valves 21 and 22 are likewise opened so that this brake fluid fed can reach the wheel brake cylinders of the left and right rear wheel. The return is effected via the discharge valve 24. Modulation is effected by the known hydraulic multiplexing process.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system for feeding brake fluid at different pressures to first and second brake circuits for braking front and rear wheels including a master brake cylinder for producing a brake pressure on the brake fluid controllable by means of a brake pedal and transmitting the brake fluid under pressure to said first and second brake circuits via first and second main lines (4, 17), said first main line (4) connects the master brake cylinder to first and second front wheel brake cylinders via a first branch line (5) and a second branch line (6), and said second main line (17) connects the master brake cylinder to first and second rear wheel brake cylinders via a third branch line (18) and a fourth branch line (19), at least one first shutoff valve (7) is incorporated in said first branch line and at least one second shutoff valve (8) is incorporated in said second branch line (6) of the first brake circuit, and at least one third shutoff valve (20) is incorporated in said second main line of said second brake circuit, at least one pump that communicates downstream of the at least one first and second shutoff valves (7, 8) in said first and second branch lines (5, 6) and downstream of the at least one third shutoff valve (20) in said second brake circuit, a first shutoff and selection valve (21) in said third branch line and a second shutoff and selection valve 22 in said fourth branch line, and a return and check valve (24) connected with said third and fourth branch lines and to a return line (15) for returning brake fluid to a supply container (16), said at least one pump having an outlet connected with a feed system (E, E1), which has first and second pressure limiting valves (37, 38) of different pressure levels for feeding brake fluid at different pressures to the first and second brake circuits, and also to said supply container (16) whereby a brake pressure made available by means of the feed system (E, E1) to the second brake circuit that brakes the rear wheels is higher than a pressure simultaneously made available to the first brake circuit braking the front wheels.

2. A brake system as defined by claim 1, in which a first feed valve (43) is incorporated between said feed system (E) and said first branch line (5) of said first brake circuit, a second feed valve (46) is incorporated between the feed system (E) and the second branch line (6) of said first brake circuit, and a third feed valve (32) is incorporated between the feed system (E) and said main line (17) of said second brake circuit.

3. A brake system as defined by claim 2, in which a first check valve (44) is disposed between the first feed valve (43) and the first branch line (5) of the first brake circuit and a second check valve (47) is disposed between the second feed valve (46) and the second branch line (6) of the first brake circuit.

4. A brake system as defined by claim 2, in which said pump of the feed system (E) is a self-aspirating pump (27).

5. A brake system as defined by claim 4, in which the pump (27) communicates via a first line (31) directly with said third feed valve (32) of the second brake circuit, while a feed pressure for said first and second feed valves (43, 46) of the first brake circuit is controlled via said first and second pressure limiting valves (37, 38) connected in series.

6. A brake system as defined by claim 5, wherein following the pump (27), the first pressure limiting valve (37) and following said first pressure limiting valve (37), the second pressure limiting valve (38) has a connecting second line (39) to said supply container (16) for return of the brake fluid supply to said container (16), and a feed third line (41) to the first and second feed valves (43, 46) of the first brake circuit branches off from a fourth line between said first and second pressure limiting valves (37, 38).

7. A brake system as defined by claim 5, in which between the pump (27) and the first pressure limiting valve (37), within the first line (31) for feeding brake fluid into the second brake circuit, a shutoff valve (36) is provided for furnishing a fluid pressure for traction control of the second brake circuit.

8. A brake system as defined by claim 5, in which traction control in the second brake circuit is effected downstream of the third feed valve (32) via said first and second shutoff and selection valves (21, 22).

9. A brake system as defined by claim 4, in which the pump is a dual-circuit pump (27a) including first and second pump circuits, wherein one pump circuit communicates directly with said first and second feed valves (43, 46) of the first brake circuit via a fifth line (35b), and the second pump circuit communicates with the third feed valve (32) of the second brake circuit via a sixth line (35a).

10. A brake system as defined by claim 9, in which the second pressure limiting valve (38), which joins the fifth line (35b) to the return line (15) leading to the supply container (16) for brake fluid, is connected with the first circuit of the pump (27a) and is provided with a first pressure limit value via a connection (57) to the main line (4) of the first brake circuit that connects with the master brake cylinder (1).

11. A brake system as defined by claim 10, in which the first pressure limiting valve (37), which joins the sixth line (35a) to the return line (15) leading to the supply container (16) for brake fluid, is connected with the second pump circuit of the pump (27a) and is provided with a second pressure limit value via a connection line (56) to the second main line (17) of the second brake circuit that discharges from the master brake cylinder (1).

12. A brake system as defined by claim 9, in which the first pressure limiting valve (37), which joins the sixth line (35a) to the return line (15) leading to the supply container (16) for brake fluid, is connected with the second pump circuit of the pump (27a) and is provided with a second pressure limit value via a connection line (56) to the second main line (17) of the second brake circuit that discharges from the master brake cylinder (1).

13. A brake system as defined by claim 1, which includes a first feed valve (43) incorporated between said feed system (E2) and said first and second branch lines of said first brake circuit, a first electromagnetic valve (83) disposed between the first feed valve (43) and the first branch line (5) and a second electromagnetic valve (84) disposed between the first feed valve (43) and the second branch line (6) of the first brake circuit and each of said first and second electromagnetic valves have a brake fluid check position.

14. A brake system as defined by claim 1, in which a first pressure detector ($P_{Servo}$) is connected with the feed system (E2), and a second pressure detector ($P_v$) for a pressure of the master brake cylinder and a third pressure detector ($P_n$) for the feed pressure achieved are associated with the second brake circuit.

15. A brake system as defined by claim 14, in which a pedal travel transducer (S) is controlled by the brake pedal (3).

16. A brake system as defined by claim 15, in which the first, second and third pressure detectors ($P_{Servo}$, $P_v$ and $P_n$), and a pedal travel transducer (S) have a separate connection to a control unit (70).

17. A brake system as defined by claim 14, in which the first, second and third pressure detectors ($P_{Servo}$, $P_v$ and $P_n$), and a pedal travel transducer (S) have a separate connection to a control unit (70).

18. A brake system as defined by claim 14, in which at least one pump communicates with the second brake circuit via a first feed (32) and with the first brake circuit via a second feed valve (43).

19. A brake system as defined by claim 18, in which at least one electromagnetic valve (83, 84) is incorporated between the first feed valve (43) and the first brake circuit.

20. A brake system for feeding brake fluid at different pressures to first and second brake circuits for braking front and rear wheels including a master brake cylinder and front and rear wheels for producing a brake pressure controllable by means of a brake pedal and transmitting the brake pressure to first and second brake circuits via first and second main lines (4, 17), said first main line connects the master brake cylinder to corresponding front wheel brake cylinders via branch lines (5, 6) and said second main line connects the master brake cylinder to wheel brake cylinders of the rear wheels, wherein at least one shutoff valve (7, 8) is incorporated in each branch line of the first brake circuit, and at least one shutoff valve (20) is incorporated in said second main line of said second brake circuit, a feed system (E) and a self-aspirating pump (27) are connected with a supply container (16), following the self-aspirating pump (27), a first pressure limiting valve (37) and following the first pressure limiting valve, a second pressure limiting valve (38) has a first connecting line (39) to said supply container (16) for returning a brake fluid from said self-aspirating pump, a feed line (41) to first and second feed valves (43, 46) of the first brake circuit branches off from a second line between said first and second pressure limiting valves (37, 38), the self-aspirating pump (27) communicates via a third line (31) directly with a third feed valve (32) of the second brake circuit, while a feed pressure for said first and second feed valves (43, 46) of the first brake circuit is controlled via said first and second pressure limiting valves (37, 38), said first and second feed valves (43, 46) communicates with said first brake circuit downstream of the at least one shutoff valve (7, 8) in each of said branch lines (5, 6) and said third feed valve communicates with said second brake circuit downstream of the at least one shutoff valve (20) in said second brake circuit for feeding brake fluid at different pressures to the first and second brake circuit, and a fourth line (35) discharging from the pump (27) into the first pressure limiting valve (37) has a diameter ($d_1$) that is smaller than a diameter ($d_2$) of one end of said first pressure limiting valve (37) of a valve body (51), which closes the fourth line (35) and on another end, the valve body (51) is acted upon by a feed pressure ($P_E$) between the first and second pressure limiting valves (37, 38).

21. A brake system as defined by claim 20, in which said second line arriving from the first pressure limiting valve (37) and connected with said second pressure limiting valve (38) is closed by a ball (53), that seats against a valve seat having a diameter ($d_3$) which is equivalent to a diameter ($d_2$) of a valve body (51a) of said second pressure limiting valve (38), which keeps the ball (53) in the valve seat and is acted upon by the pressure that prevails in the second brake circuit from the master brake cylinder to the shutoff valve (20).

22. A brake system for feeding brake fluid at different pressures to first and second brake circuits for braking front and rear wheels including a master brake cylinder, front and rear wheels for producing a brake pressure controllable by means of a brake pedal and transmitting the brake pressure to first and second brake circuits via first and second main lines (4, 17), said first main line connects the master brake cylinder to corresponding front wheel brake cylinders via branch lines (5, 6) and said second main line connects the master brake cylinder to wheel brake cylinders of the rear wheels, wherein at least one shutoff valve (7, 8) is incorporated in each branch line of the first brake circuit, and at least one shutoff valve (20) is incorporated in said second main line of said second brake circuit, a feed system (E) and a self-aspirating pump (27) are connected with a supply container (16), following the self-aspirating pump (27), a first pressure limiting valve (37) and following the first pressure limiting valve, a second pressure limiting valve (38) has a first connecting line (39) to said supply container (16) for returning a brake fluid from said self-aspirating pump, a feed line (41) to first and second feed valves (43, 36) of the first brake circuit branches off from a second line between said first and second pressure limiting valves (37, 38), the self-aspirating pump (27) communicates via a third line (31) directly with a third feed valve (32) of the second brake circuit, while a feed pressure for said first and second feed valves (43, 46) of the first brake circuit is controlled via said first and second pressure limiting valves (37, 38), said first and second feed valves (43, 46) communicate with said first brake circuit downstream of the at least one shutoff valve (7, 8) in each of said branch lines (5, 6) and said third feed valve communicates with said second brake circuit downstream of the at least one shutoff valve (20) in said second brake circuit for feeding brake fluid at different pressures to the first and second brake circuit, in which a fourth line (35) from the first pressure limiting valve (37) and connected with said second pressure limiting valve (38) is closed by a ball (53), that seats against a valve seat having a diameter ($d_3$) which is equivalent to a diameter ($d_2$) of a valve body (51a) of said second pressure limiting valve (38), which keeps the ball (53) in the valve seat and is acted upon by the pressure that prevails in the second brake circuit from the master brake cylinder to the shutoff valve (20).

23. A brake system for feeding brake fluid at different pressures to first and second brake circuits for braking front and rear wheels including a master brake cylinder, front and rear wheels for producing a brake pressure controllable by means of a brake pedal and transmitting the brake pressure to first and second brake circuits via first and second main lines (4, 17), said first main line connects the master brake cylinder to corresponding front wheel brake cylinders via branch lines (5, 6) and said second main line connects the master brake cylinder to wheel brake cylinders of the rear wheels, wherein at least one shutoff valve (7, 8) is incorporated in each branch line of the first brake circuit, and at least one shutoff valve (20) is incorporated in said second main line of said second brake circuit, a feed system (E) and a self-aspirating dual circuit pump (27a) are connected with a supply container (16), said self-aspirating dual-circuit pump (27a) includes first and second pump circuits, wherein said first pump circuit communicates directly with first and second feed valves (43, 46) of said first brake circuit via a first line (35b), and the second pump circuit communicates with a third feed valve (32) of said second brake circuit via a second line (35a), and a third line (31), a first pressure limiting valve (37) is connected to the second pump circuit via the second line (35a) and joins the second line (35a) to a fourth line (15) leading to the supply container (16) for return of brake fluid to said supply container, the first pressure limiting valve is provided with a pressure control connection via a connection line (56) to the second main line (17) of the second brake circuit that discharges from the master brake cylinder (1), and said first pressure limiting valve includes a valve body (51) having a first face acted upon by pressure from the second main line (17), said valve body (51) is inside the first pressure limiting valve (37) and said first face is larger than a second face, which is subject to the pressure from the second line (35a).

24. A brake system as defined by claim 18, in which the second circuit of the dual-circuit pump (27a) communicates with the second brake circuit via the third feed line (31), and the third feed valve (32) is a feed and shutoff valve (58).

25. A brake system as defined by claim 23, in which the at least one shutoff valve (7, 8), first and second discharge valves (13, 14), first and second shut off and selection valves (21, 22), said at least one shutoff valve (20) in said second main line, a return valve (24), a first feed valve (32), a second feed valve (43) and third and fourth electromagnetic valves (83, 84) and a motor (77) of the pump (27a) are connected to a control unit (70).

* * * * *